Sept. 22, 1931.   O. F. A. E. GRUMPELT   1,824,667
ROTARY PROPELLER
Filed April 28, 1928    5 Sheets-Sheet 1
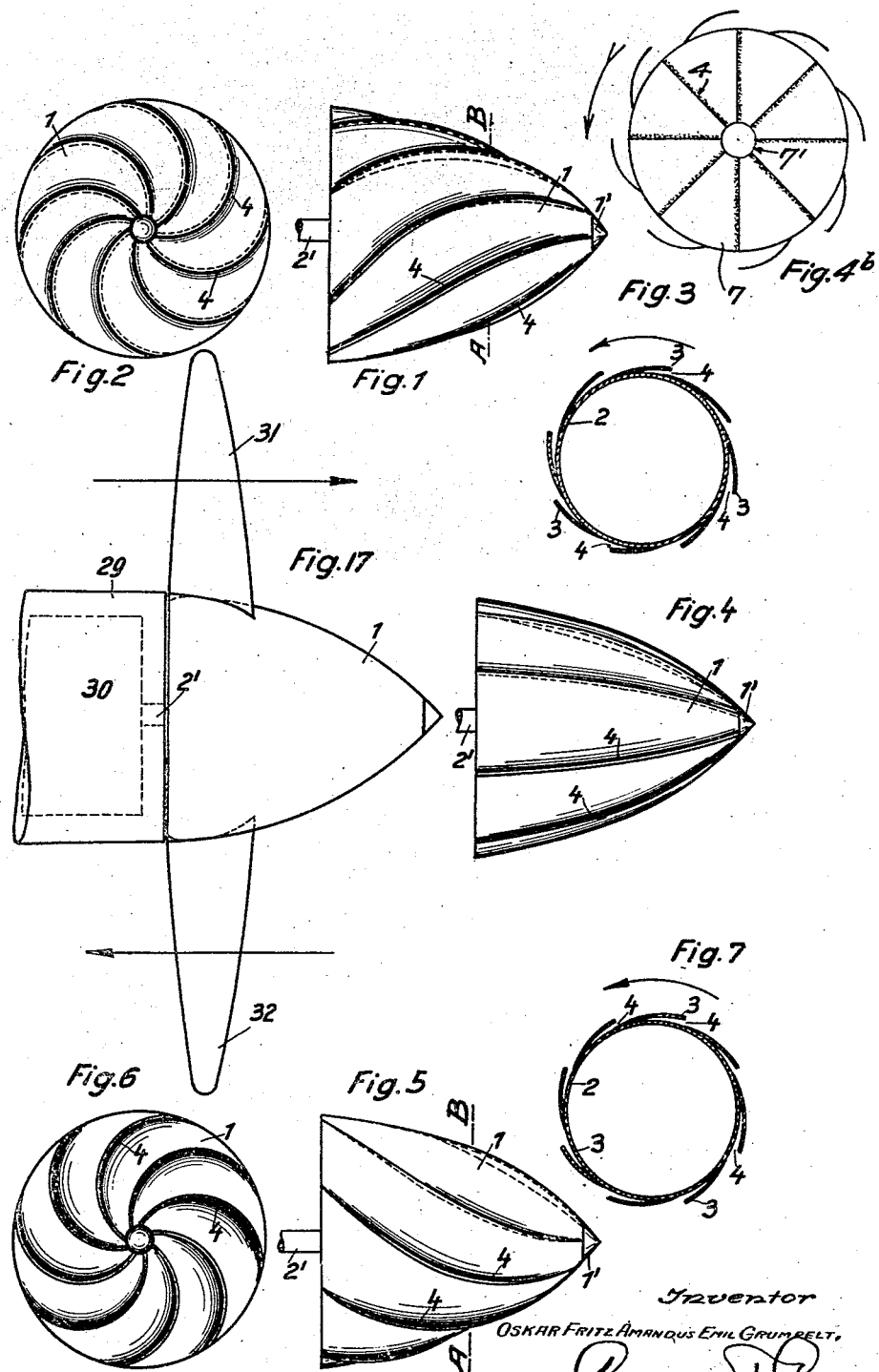

Sept. 22, 1931.    O. F. A. E. GRUMPELT    1,824,667
ROTARY PROPELLER
Filed April 28, 1928    5 Sheets-Sheet 2

INVENTOR:
OSKAR FRITZ AMANDUS EMIL GRUMPELT.
ATT'Y.

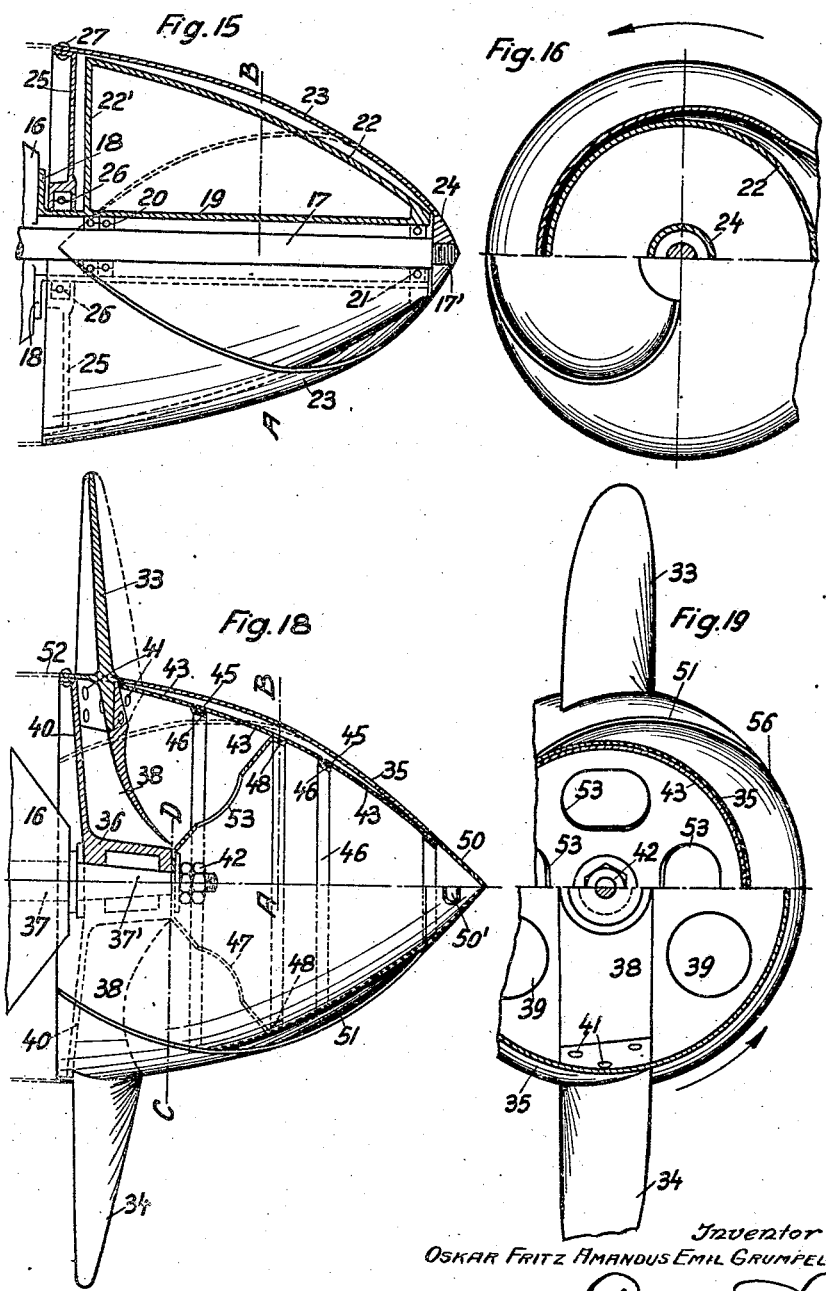

Sept. 22, 1931.     O. F. A. E. GRUMPELT     1,824,667
ROTARY PROPELLER
Filed April 28, 1928     5 Sheets-Sheet 4

Inventor
OSKAR FRITZ AMANDUS EMIL GRUMPELT,
ATT'Y.

Sept. 22, 1931.    O. F. A. E. GRUMPELT    1,824,667
ROTARY PROPELLER
Filed April 28, 1928    5 Sheets-Sheet 5
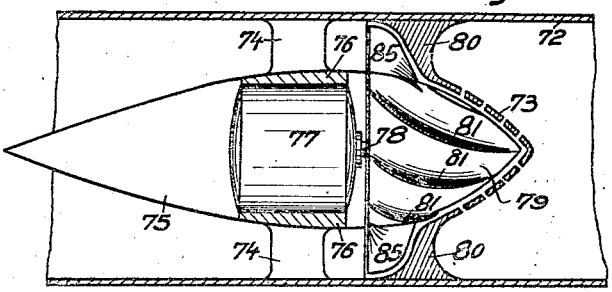
Fig. 23
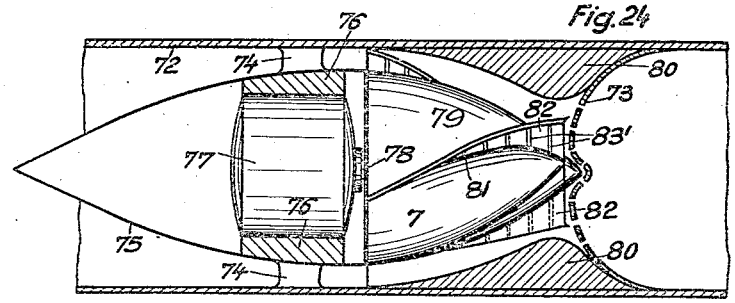
Fig. 24
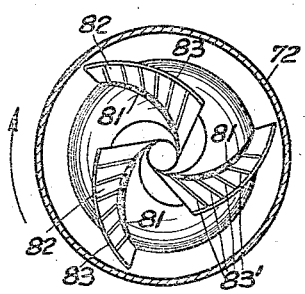
Fig. 25
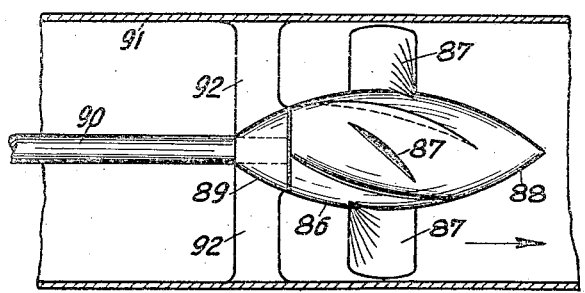
Fig. 26
Inventor
OSKAR FRITZ AMANDUS EMIL GRUMPELT,
Atty.

Patented Sept. 22, 1931

1,824,667

UNITED STATES PATENT OFFICE

OSKAR FRITZ AMANDUS EMIL GRUMPELT, OF BERLIN, GERMANY, ASSIGNOR, BY MESNE ASSIGNMENTS, TO SYNDICAT "VAPROC," OF BRUSSELS, BELGIUM, A COMPANY OF BELGIUM

ROTARY PROPELLER

Application filed April 28, 1928, Serial No. 273,641, and in Germany July 20, 1926.

My invention relates to improved means for passing a body showing a small resistance through a medium or for setting up movement in any desired media or for securing power from flowing media, or more particularly to a rotary propeller.

With a view to reducing resistance, for instance, air resistance, it has been proposed to cover the boss of a propeller of aircraft with a conical streamline hood. Such hoods do not reduce the air resistance but, as the number of revolutions increases, they augment it. Moreover the circular motion of the hood deviates the streams of air which should be led to the propeller and those streams of air are thrown off precisely at the places where they should be guided to the centre of the propeller, thereby reducing the efficiency of the latter.

One object of the present invention is to provide a rotary propeller designed to move relatively to a surrounding medium in axial direction and offering no resistance to the medium but, on the contrary, producing a suction effect upon the medium or, as it were, a negative resistance. One feature of novelty of the instant invention resides in a conical, parabolic or streamline-shaped rotary cap or hood provided with stepped shoulders, forming steps or pockets. For explaining the effect of the rotary hood, the following theory is offered. Around the hood, by its simple rotation, a zone under partial vacuum is formed, the medium being ejected from the steps or pockets, and a partial vacuum created in and behind them. These steps may be made hollow so as to form chambers from which the air is also evacuated by the depression behind the steps, caused by the rotation of the hood. The medium in front of the hood tends to equalize the partial vacuum in and behind the steps and pockets and flows at an accelerated velocity rearwardly from the tip of the hood to its base.

By a reason of the fact that a suctional effect is produced upon the medium in which the hood acts it is possible (1) with a rotating but stationary hood for the medium to have imparted to it an acceleration towards the rear, whereby the separated streams of the medium are advantageously conveyed from the hood along a streamline body, and (2) with a hood which rotates and moves in a forward direction, to reduce the action of the medium which would resist the forward movement of the object behind the hood, as the object proceeds into a zone of depression.

A particularly advantageous effect is secured by providing the hood with a plurality of radially disposed propeller blades in addition. The particles of the medium which move uniformly very close to the hood, concentrate at the base of the blades. The effect of suction produced by the hood causes, when operating for example in air, the wind from the hood to be guided to the boss of the propeller blades, with a resultant increase of efficiency of the propeller blades. In this case the part of the hood provided with steps and pockets may be cylindrical at the point where the propeller blades are fitted without altering the effect in any way.

Several embodiments of the invention are diagrammatically illustrated in the drawings, by way of example.

Figures 1 to 7 illustrate hoods with steps and pockets variously disposed.

Figures 1, 4 and 5 are side views, while Figures 3 and 7 are sections on the lines A—B of Figures 1 and 5 respectively, and Figures 2, 4b and 6 are end elevations corresponding to Figures 1, 4 and 5.

Figure 4b is an end view of Figure 4.

Figure 15 illustrates in partial longitudinal section a special construction of the hood.

Figure 16 illustrates in the bottom half an end elevation and in the upper a section on the line A—B of Figure 15.

Figure 17 shows in elevation a suction hood with propeller blades. To render the figure more easily understood the pockets are omitted.

Figure 18 shows in side elevation a hood provided with additional blades, partly in longitudinal section.

Figure 19 is a cross-section in the upper part on the line A—B, and in the lower part on the line C—D of Figure 18.

Figures 23 to 26 illustrate examples of the application of the suction hood as a stationary hood.

Figure 23 shows in partial longitudinal section the fitting of the hood in a vacuum cleaning apparatus.

Figure 24 is a longitudinal section through a modified construction in which a special or improved arrangement of steps and pockets is provided.

Figure 25 is an end elevation of the hood illustrated in Figure 24 with the casing shown in section.

Figure 26 shows in longitudinal section the application of the hood and blades as a conveyor device in a tube or the like.

Figures 1, 2 and 3 show the disposition and arrangement of the steps and pockets upon the casing of the hood 1. The hood consists preferably of a thinwalled metal body 2 of conical, parabolic or streamline shape, upon which, as shown in Figure 3, metal strips or mantle plates 3 are provided in such a way that they form suction pockets opening in tangential direction and present circumferentially arranged, stepped fluid contact surfaces. The rotatable hood is driven by a longitudinal axle 2' with which the mantle plates are connected and which may be coupled with the crank shaft of an engine; its direction of rotation is shown by an arrow in Figure 3, the hood is always rotated in such a direction that the pockets are never exposed directly to the surrounding medium or, in other words, the pockets open in a direction inverse or contrawise to the direction of rotation of the hood.

In Figure 4 the pockets which are open in circumferential direction, extend from the base of the hood to the tip in an axial plane. The projecting edge of each mantle plate extends from a foremost point 1' near the axis of rotation outwardly and rearwardly and each mantle plate is slightly inclined towards an imaginary circumferential circle whereby said edge is spaced in radial direction from the adjacent plate.

In Figure 5 the outwardly projecting edge of each blade extends along a helical line around the axis which runs, when viewed from the forward end of the hood, in the circumferential direction in which said edge points, i. e. the clockwise direction in Fig. 7.

When the hood is to travel forward at a great speed the pockets are arranged as shown in Figure 1 in order that a partial vacuum is formed behind them even when the speed of progression approaches the peripheral speed. The pockets in Figure 5 are open at the front, such arrangement having special utility when there is very little forward speed or none at all, that is to say, when the hood has no bodily movement of translation.

At speeds between these two limits the pockets are advantageously provided upon the hood as shown in Figure 4.

Figure 8:
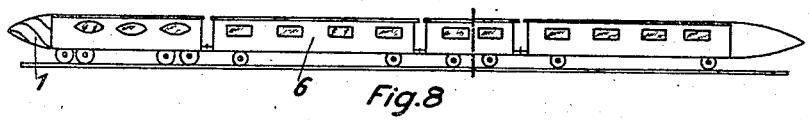
Figures 8 to 14 illustrate various examples of the manner in which the suction hood may be employed.

The hood 1 may be disposed in front of any desired body, such, for example, as a locomotive or the motor or engine of a train 6, as shown in Figure 8. In this case the hood is rotated by means of any suitable driving mechanism, and the air flows off unimpeded in such manner that the vehicle encounters much less resistance than is usual and thus greater speeds can be secured with the same expenditure of energy.

Figure 9:
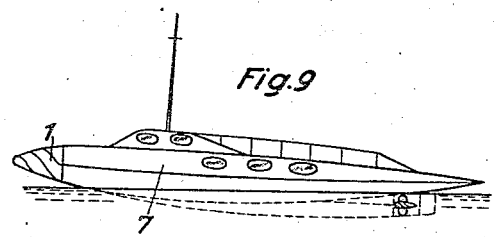
Figure 10:
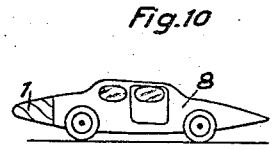
Figure 11:
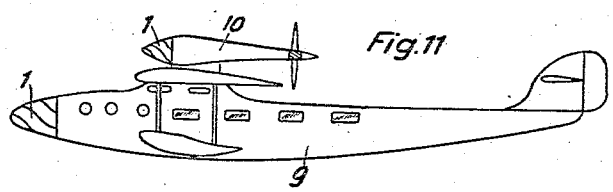
Figure 12:
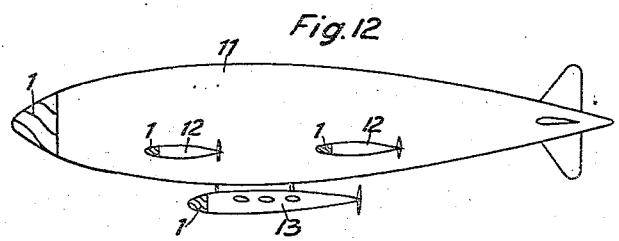
Figure 13:
Figure 14:
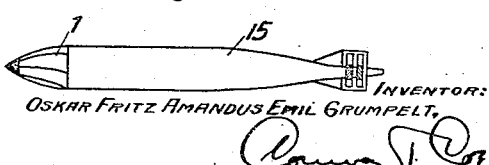

The conditions are similar if the bow of a watercraft, as shown in Figure 9, or the radiator of a motor car 8, as shown in Figure 10, is provided with the rotating hood 1. A particularly advantageous form is that for hydroplanes (Figure 11) where the fuselage 9 and the car 10 for the motor are provided with the hood at the forward end. Figure 12 illustrates an airship 11 that is provided with the hood at the nose and on the cars 12 for the motors and the passenger car 13. A particularly important and favourable field for the use of the hood is represented by the projectile 14 illustrated in Figure 13, which, if fitted with the hood 1, has, at the same range, a lower azimuth. The same applies if air or water torpedos 15 are provided at the nose with the suction hood 1 as shown in Figure 14.

In all these uses of the hood the method of working is improved considerably if the body to which the hood is attached is made with a streamline form, as shown in Figure 8, for railway trains, and in Figure 10, for automobiles.

A preferable structural form of the hood designed to form the nose of an aeroplane fuselage is illustrated in Figures 15 and 16. In these figures, 16 is a driving motor, which rotates the spindle or axle 17. This spindle is mounted in the bearings 20 and 21 in the inner tubular part 19 of a metal body that is fixedly connected to the motor at 18. The metal body consists advantageously of a thin-walled casting and has an outer curved wall 22.

A plurality of mantle plates 23 are connected with and circumferentially disposed around the axle 17. Each mantle plate has an edge extending from a foremost point 24 near the axis of rotation outwardly and rearwardly, and each mantle plate is slightly inclined towards an imaginary circumferential circle whereby said edge is spaced in radial direction from the adjacent plate. The rotating plates 23 are connected to a nose cap which is screwed upon the shaft 17 provided with a thread 17'. At the rear of the plates 23 is riveted by rivets 27 a disc-like end plate or transverse wall 25 which rotates upon ball bearings 26. Figure 16 shows the disposition and form of the pockets in which the helical edge of the blades, which extends from the tip or approximately from the tip to the transverse wall, is so disposed that it runs when viewed from the tip of the hood, in clockwise direction, in which the edge points. This has a very favourable effect on the efficiency. Owing to the provision of the walls 22 and 25 the hood is closed to prevent a flow of the medium through its interior.

In Figure 17 the suction hood 1 is provided in addition with propeller blades 31, 32 and furthermore the body 29, which, in this case, is provided at the rear of the hood, is conformed to the base surface of the hood so that smooth passage of the medium is secured. The driving motor, which is shown diagrammatically, is numbered 30. The arrows indicate that the hood with the propeller blades can at one time work as a tractor (upper arrow) and another time as a propeller (lower arrow), according to the position of the suction steps and pockets and the arrangement of the blades. In Figure 17 the pockets or steps are not shown for sake of simplicity.

Figure 18 illustrates a preferred construction. Here the suction hood is provided with a plurality of propeller blades 33 and 34 carried by, and radially extending from the hood. This construction is more particularly designed for aircraft. The part 40 which forms the transverse rear wall of the hood is provided with a boss 36 for connection to the motor spindle 37. From the boss radiate arms 38, which may be of any desired strength and which are formed integrally with the disc-shaped rear wall 40. The latter is provided with holes 39 (Figure 19) reducing the weight. Rivets or screws 41 are employed for connecting the actual propeller blades 33 and 34 to the arms 38. The boss 36 is mounted upon the conical journal 37' of the spindle and is fixed thereon by screw bolts and nuts 42.

The hood itself consists of thin-walled pressed metal rings 43 which at the one side 46 are offset to form a flange upon which the edge 45 of the adjacent ring is accommodated and connected by rivets or by welding to form a rigid, smooth unitary structure.

In the interior a plate reinforcement 47 is provided which, at 48, extends along the whole periphery of the inner surface of the hood, and which is, furthermore, mounted by means of a central hole upon the journal 37' and pressed by the nuts on the screw bolt 42 against the boss 36. The reinforcement 47 is provided with holes 53 through which the connections of the propeller blades of the arms 38 are accessible. The tip piece 50 of the hood is removable and is provided with an aperture 50' to enable the inner connections to be controlled.

Mantle plates 35 are provided upon the outer surface of the hood and are riveted or welded at one side to the hood and bent to be slightly inclined towards an imaginary circumferential circle. Consequently the other side or edge is spaced from the outer surface of the hood and thus form a chamberlike pocket as shown at 51 in Figures 18 and 19.

52 is the fuselage body to which the hood is fitted.

Figure 20:
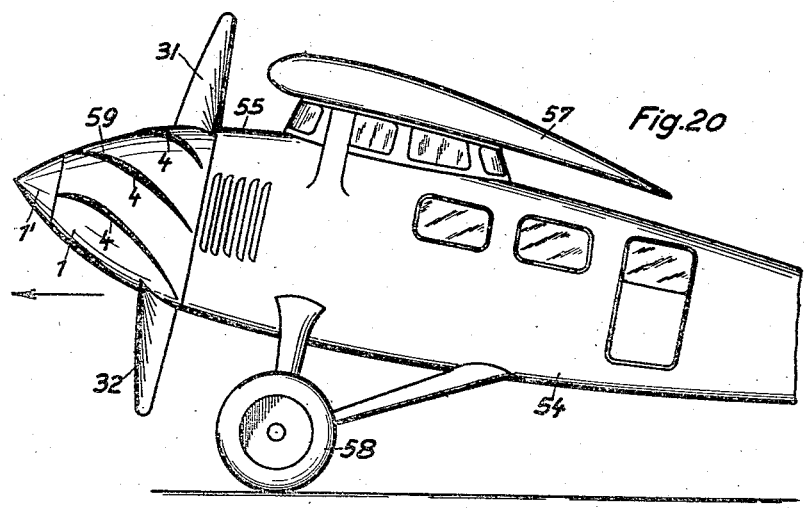
Figure 20 shows the application of a suction hood with blades for driving aircraft.

The hood shown in Figure 18 is mounted, according to Figure 20, on an aeroplane 54 provided with supporting wing 57 and the running wheels 58. At the front end 55 the body of the aeroplane is shaped to conform to the diameter 56 of the base (Figure 19) of the hood so that the wind from the propeller can flow off without hindrance. The steps and pockets 4 of the hood 1 are curved in their forward part 59, because, by reason of the smaller diameter at the point, a smaller peripheral speed should otherwise not produce a sufficient forward movement of the pockets.

Figure 21:
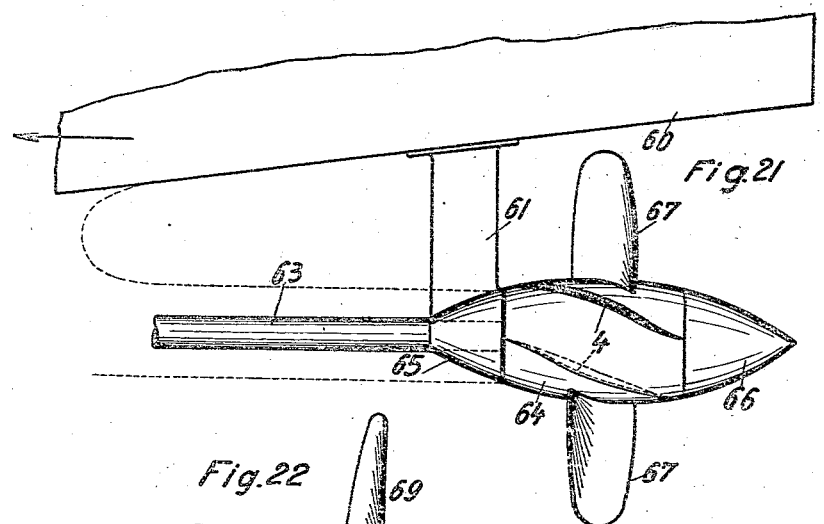
Figure 21 shows the hood provided with blades for driving a ship.

In Figure 21 the hood is constructed as a boss for a ship's screw or propeller. The bracket 61 for the propeller shaft is fitted to the hull of the ship and the propeller shaft 63 is mounted in a conical bearing 65. The rear rotating part of the boss 64 is followed by a fixed streamline body 66 of suitable form. The boss 64 is provided with steps and pockets 4 according to the invention and with two propeller blades 67. When the boss is rotated the medium is drawn, fed to the boss of the propellers and flows off therefrom at the rear. The ship moves in the direction indicated by the arrow in Figure 21.

Figure 22:
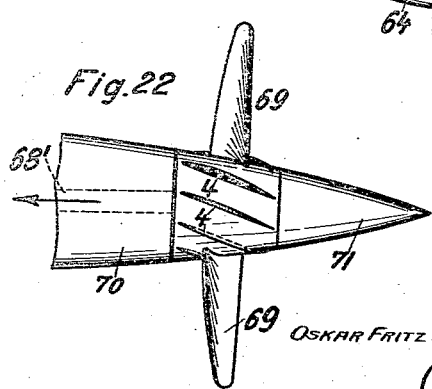
Figure 22 is a hood with blades for use as a propeller for driving, for example, an airship or a torpedo.

In Figure 22 the boss, provided with the suction steps and pockets 4 together with the propeller blades 69, is disposed at the rear part of an aeroplane or hydroplane in such manner that the screw acts as a propeller. The hood is in this case adapted in form to the body itself and it is inserted between a forward stationary part 70 and the rear streamline part 71 of the body. 68' is the driving shaft. The arrow in Figure 22 indicates the direction in which the body to be driven forward is moved.

In Figure 24, 72 is the casing of a vacuum cleaner in which the dust sieve 73 is secured. A streamline body 75 is mounted in arms or stays 74 that are connected to the casing. The driving motor 77 is provided in the interior, mounted in bearings 76. The hood 79 is mounted upon the driving shaft 78. Within the casing 72 special bodies 80 are provided which form an air channel having a particular form and cross-section. The steps and pockets 81 according to the invention are provided upon the hood 79. Furthermore, in addition to the steps and pockets blades 82 are disposed in the same direction as the steps and pockets. These blades have an upwardly bent outer edge 83. Upon the suction side of the blades there are provided in this construction radially disposed additional stepped pockets 83', which have for their purpose to form a sort of renewed rarifaction of the air to the rear of each main step.

In Figure 23 a hood provided with blades is likewise provided in a vacuum cleaner. The parts have the same reference numerals as in Figure 24. Pockets 81 in this example are of the forwardly open shape. The strong suction action is increased by the two blades 85 that are fitted to the hood. As compared with many vacuum cleaners now on the market, the use of the hood according to the invention has the special advantage that the air cannot flow back to the boss of the blades by reason of the suction effect produced by the boss.

Figure 26 shows the use of the new hood with propellers for feeding air or any other medium. The hood 86 is formed as a boss and is provided with four blades 87. The hood has the streamline formation at its rear end 88, while to the forward part a stationary body 89 similarly adapted to the streamline shape is fitted, which, at the same time, serves as a bearing for the driving shaft 90 which is connected to the hood. The bearing body 89 is inserted into a rib-shaped transverse stay 92 connected to the casing 91, the stay being so shaped that the least possible resistance is offered to the medium flowing past. According to the direction of rotation and the disposition of the suction steps and pockets, the medium is either drawn by suction through the casing 91 from the end where the end 88 of the hood is disposed or on the contrary is pressed through the casing from the operative side. In Figure 26 the steps and pockets are so arranged that the medium is forced in the direction of the arrow.

The invention is not confined to the forms illustrated. Moreover, only some of the uses of the invention are described and illustrated. The invention may be employed in all cases where a rotary propeller is designed to move relatively to a surrounding medium in axial direction, no matter whether the propeller is power driven to produce such relative movement or whether the flowing medium is to drive the propeller as is the case in wind mills and the like. The term "propeller" as used in the claims is intended to apply to both cases with equal force.

Although it is preferable to provide actual pockets in the hood, whenever it is impractical to form such pockets, such as when the nature of the material or the dimensions of the hood forbids, a similar result may be obtained although in a less degree by carving steps out of the hood surface. Therefore, for the purpose of the present invention, the terms "pockets" and "steps" may be considered synonymous.

A distinction must be drawn in the use of the terms "propeller" and "propeller blades." The term "propeller" has been used to denote the rotating hood, regardless of whether the latter is supplied with blades or not; the term "propeller blades" refers to such elements specifically.

It should likewise be understood that the term "clockwise" has no significance apart from the particular figure in which it is used as a descriptive term. The hood may be rotated in either a clockwise or contraclockwise direction, the important factor being that its direction of rotation must be inverse or contrawise to the direction in which the pockets open. Thus, the pockets are not directly exposed to the surrounding medium and in the rotation of the hood do not act to fan or paddle the surrounding medium. On the contrary, the direction of rotation of the hood and the direction of opening of the pockets is such that the pockets produce a suction or negative pressure effect.

I claim:

1. A propeller for use in a fluid medium comprising a rotatable body having a stream lined casing which is closed at its tip, and stepped fluid contact surfaces associated with said casing, said contact surfaces extending tangentially from said casing to rise in a direction inverse to that of the rotation thereof, and means for rotating said body.

2. A propeller for use in a fluid medium comprising a rotatable body having a stream lined casing which is closed at its tip, and a plurality of flat strips connected to said casing, said strips extending tangentially from said casing to rise in a direction inverse to the rotation thereof and thereby to present a plurality of circumferentially arranged stepped fluid contact surfaces each forming an open pocket with the casing, and means for rotating said body.

3. Device as claimed in claim 1 wherein the raised edges of the stepped fluid contact surfaces run in straight lines between the tip and the base of the casing.

4. Device as claimed in claim 2 wherein the raised edges of the strips presenting the fluid contact surfaces extend along a helical line passing the axis of rotation in the direction of rotation.

5. Device as claimed in claim 2 wherein the raised edges of the strips presenting the fluid contact surfaces extend along a helical line passing about the axis of rotation in a direction opposite to that of rotation.

6. Device as claimed in claim 1 wherein two or more wing propeller blades are attached to the rotating body.

7. Device as claimed in claim 2 wherein two or more wing propeller blades are attached to the rotating body.

In testimony whereof I affixed my signature.

OSKAR FRITZ AMANDUS EMIL GRUMPELT.